United States Patent
Jansen et al.

(10) Patent No.: US 8,716,368 B2
(45) Date of Patent: *May 6, 2014

(54) UNSATURATED POLYESTER RESIN OR VINYL ESTER RESIN COMPOSITION

(75) Inventors: Johan Franz Gradus Antonius Jansen, Geleen (NL); Ivo Ronald Kraeger, Baam (NL)

(73) Assignee: DSM IP Assets B.V., Heerlen (NL)

( * ) Notice: Subject to any disclaimer, the term of this patent is extended or adjusted under 35 U.S.C. 154(b) by 980 days.

This patent is subject to a terminal disclaimer.

(21) Appl. No.: 11/921,646

(22) PCT Filed: Jun. 6, 2006

(86) PCT No.: PCT/EP2006/005353
§ 371 (c)(1),
(2), (4) Date: Dec. 6, 2007

(87) PCT Pub. No.: WO2006/131295
PCT Pub. Date: Dec. 14, 2006

(65) Prior Publication Data
US 2009/0156750 A1    Jun. 18, 2009

(30) Foreign Application Priority Data

Jun. 10, 2005   (EP) .................................... 05076357

(51) Int. Cl.
*C08L 67/00* (2006.01)
*C08K 5/07* (2006.01)
*C08L 33/04* (2006.01)
*C08L 67/06* (2006.01)
*C08K 5/00* (2006.01)
*C08K 5/16* (2006.01)
*C08K 3/08* (2006.01)

(52) U.S. Cl.
CPC ................ *C08L 33/04* (2013.01); *C08L 67/06* (2013.01); *C08K 5/0025* (2013.01); *C08K 5/0091* (2013.01); *C08K 5/16* (2013.01); *C08K 2003/0818* (2013.01)
USPC ........... 523/500; 524/357; 524/563; 524/604; 528/303

(58) Field of Classification Search
CPC ....... C08L 33/04; C08L 67/06; C08K 3/0041; C08K 5/0025; C08K 5/0091; C08K 5/16; C08K 2003/0818; C08K 2003/28
USPC .............. 260/864, 75, 40; 252/431; 523/456, 523/500; 524/291, 302, 357, 394, 398, 337, 524/413, 554, 563, 604; 525/329.5, 49, 40, 525/303, 415, 15–17, 41; 528/303–304, 528/306

See application file for complete search history.

(56) References Cited

U.S. PATENT DOCUMENTS

| | | | |
|---|---|---|---|
| 3,398,213 A | 8/1968 | Chetakian | |
| 3,574,787 A | 4/1971 | Rudolph et al. | |
| 3,584,076 A | 6/1971 | Chetakian | |
| 3,653,954 A | 4/1972 | Gangi | |
| 5,395,866 A | 3/1995 | Ross et al. | |
| 5,637,356 A * | 6/1997 | Kerr et al. | 427/386 |
| 5,770,653 A * | 6/1998 | Matsukawa et al. | 525/168 |
| 6,268,464 B1 * | 7/2001 | Keinanen et al. | 528/272 |
| 2002/0137972 A1 * | 9/2002 | Syed et al. | 568/304 |
| 2002/0173593 A1 * | 11/2002 | Udding et al. | 525/312 |
| 2003/0083443 A1 * | 5/2003 | Santobianco et al. | 525/530 |
| 2009/0030151 A1 * | 1/2009 | Jansen et al. | 525/21 |
| 2010/0029859 A1 * | 2/2010 | Jansen et al. | 525/360 |
| 2010/0069549 A1 * | 3/2010 | Jansen et al. | 524/357 |

FOREIGN PATENT DOCUMENTS

| | | | | |
|---|---|---|---|---|
| EP | 0 030 050 | 11/1989 | | |
| EP | 04 97511 | 11/1989 | | |
| EP | 0 457 276 | 5/1991 | | |
| EP | 0 598 227 | 10/1993 | | |
| GB | 1107327 | 3/1968 | | |
| JP | 52-01489 | 4/1977 | | |
| JP | 52051489 A * | 4/1977 | ............ | C08F 299/04 |
| JP | 09 309936 | 12/1997 | | |
| JP | 2001 081145 | 3/2001 | | |
| WO | 84/00765 | 3/1984 | | |

OTHER PUBLICATIONS

Machine Translation of JP 52051489A.*
Machine Translation of JP 52-051489.*
International Search Report for PCT/EP2006/005353 mailed Aug. 3, 2006.
Written Opinion of the International Searching Authority—Aug. 3, 2006.

(Continued)

*Primary Examiner* — Hannah Pak
(74) *Attorney, Agent, or Firm* — Nixon & Vanderhye P.C.

(57) ABSTRACT

This invention relates to unsaturated polyester resin or vinyl ester resin compositions comprising a polymer containing reactive unsaturations as a resin; a 1,3-dioxo-component, and optionally a reactive diluent and/or an inhibitor and/or a stabilizer; the resin compositions being curable with a peroxide component, and wherein the resin in the resin composition has an acid value=10; and the resin composition contains—while being cured—a base, which is either selected from the group of organic or inorganic oxides, hydroxides, alkoxides or carboxylates for each of which the cation has a redox potential of the metal of at most −1V, or of ammonium ions; or is selected from the group of nitrogen-containing organic compounds. The present invention also relates to objects and structural parts prepared from such resin composition by curing with a peroxide. Finally the invention also relates to methods of peroxide curing of unsaturated polyester or vinyl ester curing and its use in chemical anchoring, roof coatings etc.

32 Claims, No Drawings

(56) References Cited

OTHER PUBLICATIONS

Database WPI—Section Ch, Week 197723, Derwent Publications Ltd., London, GB; Class A23, AN 1977-40550Y, XP002329952—*corresponds to JP* 52-01489*.
Database WPI—Section Ch, Week 199807, Derwent Publications Ltd., London, GB; Class A23, AN 1998-071898, XP002350983—*corresponds to JP* 09 309936**.
Database WPI—Section Ch, Week 200148, Derwent Publications Ltd., London, GB; Class A23, AN 2001-445243, XP002350984—*corresponds to JP* 2001 081145***.
Malik et al, "Current Status of Unsaturated Polyester Resins", *J.M.S.-Reb.Macromol.Chem.Phys.*, C40(2&3), 139-165 (2000).

\* cited by examiner

UNSATURATED POLYESTER RESIN OR VINYL ESTER RESIN COMPOSITION

This application is the U.S. national phase of International Application No. PCT/EP2006/005353 filed 6 Jun. 2006 which designated the U.S. and claims priority to EP 05076357.2 filed 10 Jun. 2005, the entire contents of each of which are hereby incorporated by reference.

This invention relates to an unsaturated polyester resin or vinyl ester resin composition comprising (i) a polymer containing reactive unsaturations as a resin; and (ii) a 1,3-dioxo-component; and (iii) optionally a reactive diluent and/or an inhibitor and/or a stabilizer; which resin composition is curable with a peroxide component.

Such resins are so-called pre-accelerated resin compositions, if the 1,3-dioxo-component is already present in the resin composition before the addition of the peroxide component. In case the 1,3-dioxo-component is added together with or after the peroxide addition, then the resin compositions are called accelerated resin compositions.

The present invention also relates to objects and structural parts prepared from such resin composition by curing with a peroxide. Finally the invention also relates to methods of peroxide curing of unsaturated polyester or vinyl ester curing and its use in chemical anchoring, roof coatings etc As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

The state of the art unsaturated polyester or vinyl ester resin compositions generally are cured by means of initiation systems. In general, such unsaturated polyester or vinyl ester resin systems are cured under the influence of peroxides and are accelerated (often even pre-accelerated) by the presence of metal compounds, especially cobalt salts as accelerators. Cobalt naphthenate and cobalt octanoate are the accelerators most widely used. In addition to accelerators, the polyester resins usually also contain inhibitors and/or stabilizers for ensuring that the resin systems do not gellify prematurely (and that they have a good storage stability). Furthermore, inhibitors and/or stabilizers are used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator. Reference, for instance, can be made to U.S. Pat. No. 3,584,076 and U.S. Pat. No. 3,630,960, wherein 1,3-dioxo-compounds also called from the group of enolisable ketones are used as co-accelerators. Kolczynski et al., furthermore, have shown interesting results in the proceedings of the 24th Annual Technical Conference SPI (The Society of the Plastics Industry, Inc.), 1969, Reinforced Plastics/Composites Division, at Section 16-A pages 1-8. Namely, it can be seen that curing in the presence of cobalt and 2,4-pentanedione is much (i.e. about 10 times) faster than in the presence of cobalt alone. In all these references the acid value of the employed resin are in the range 37-50 mg KOH/kg resin. The present inventors, however, have demonstrated experimentally that this type of curing as disclosed by Kolczynski et al., however, cannot be applied to all types of resins, especially not to resins having low acid values.

Moreover, although the cobalt based accelerated resins according to the prior art can be cured at room temperature without any difficulties, curing becomes difficult at slightly lower temperatures. In general employing cobalt curing, for instance with hydroperoxides, cannot be performed efficiently below a temperature of 10° C. However in many large volume and/or outdoor applications possibilities for temperature control on the curing is very limited and curing has often to be performed at temperatures below 10° C. Consequently, there is a need for resin compositions, which exhibit a robust curing profile, i.e. which can be cured at low temperatures even below 0° C.

The inventors now have surprisingly found that unsaturated polyester resin or vinyl ester resin compositions comprising (i) a polymer containing reactive unsaturations as a resin; and (ii) a 1,3-dioxo-component; and (iii) optionally a reactive diluent and/or an inhibitor and/or a stabilizer; and which are curable with a peroxide component, exhibit the desired curing characteristics if they have the following characteristics:

a. the resin in the resin composition has an acid value ≤10; and
b. the resin composition contains—while being cured—a base, which is either
   (i) selected from the group of organic or inorganic oxides, hydroxides, alkoxides or carboxylates for each of which the cation has a redox potential of the metal of at most −1 V, or of ammonium ions; or is
   (ii) selected from the group of nitrogen-containing organic compounds.

More detailed discussion of the types of unsaturated polyester resins and vinyl ester resins that suitably can be used in the context of the present invention will be presented hereinafter. But first some other aspects and preferred embodiments of the above characteristics of the present invention will be addressed.

Preferably, in the resin compositions according to the invention, the 1,3-dioxo-component is either
(i) a 1,3 dioxo-compound according to formula 1

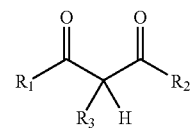

in which, independently from each other,
R$_1$ and R$_2$ represent hydrogen, or a C$_1$-C$_{20}$ alkyl or aryl or alkylaryl group, that optionally may contain heteroatoms and/or one or more ethylenic unsaturations at positions other than α to the oxo group, or represent a group OR$_4$ or NR$_4$R$_5$, with R$_4$ and R$_5$ representing hydrogen, or a C$_1$-C$_{20}$ alkyl or aryl or alkylaryl group, that optionally may contain heteroatoms and/or one or more ethylenic unsaturations, with R$_4$ and R$_5$ together with N forming a cyclic structure and
R$_3$ represents hydrogen, or a C$_1$-C$_{20}$ alkyl or aryl or alkylaryl group, that optionally may contain heteroatoms and/or one or more ethylenic unsaturations at positions other than α to the oxo groups, and wherein
any of the groups R$_1$ to R$_3$ can be cyclic, or the groups R$_1$ and R$_2$, or R$_1$ and R$_3$, or R$_2$ and R$_3$, or R$_1$ and R$_2$ and R$_3$ together form a cyclic structure,
or the 1,3-dioxo-component is
(ii) an oligomer or polymer of the compound of formula 1, which oligomer or polymer contains at least one 1,3-dioxo group.

As to the characteristic mentioned under a. it is preferred that the resin in the resin composition has an acid value <5, more preferably an acid value <3, and most preferably an acid value <1. The acid value of the resin in the resin composition, as meant herein, corresponds to the value, in mg KOH/g of resin, as is determined according to the method of ISO 3682.

The base, as mentioned in the characteristic under b., is either (i) selected from the group of organic or inorganic oxides, hydroxides, alkoxides or carboxylates for each of which the cation has a redox potential of the metal of at most −1V, or of ammonium ions; or is (ii) selected from the group of nitrogen-containing organic compounds.

Examples of suitable carboxylates are, for instance, acetates, benzoates, butyrates, propionates, adipates, mono-/di-/tri-chloroacetates, mono-/di-/tri-fluoroacetates, naphthenates, neodecanoates, valerates, oleates, stearates, tartrates, ascorbates, succinates, maleates, fumarates, phthalates, citrates, acrylates, methacrylates, itaconates, gluconates, glutarates, etc. Examples of suitable alkoxides are for instance methoxide, ethoxide, propoxide, butoxide, t-butoxide, phenolate, etc.

As meant hereinabove, the term "redox potential of the metal" refers to the values, in V (Volt), for the transition $M^{n+}$ to M (vice versa), for any specific metal M. These values can be found in CRC Handbook of Chemistry and Physics, $84^{th}$ Edition (2003-2004) in Section 8, Electrochemical Series, table 1, pages 8-23 to 8-27, CRC Press LLC, Boca Raton/London/New York/Washington, D.C. For convenience, some redox potentials for metals are given below for a number of elements. The values of the redox potentials (in V) are shown between brackets: Li (−3.0), Na (−2.7), K (−2.9), Rb (−2.9), Cs (−2.9), Be (−1.7), Mg (−2.4), Ca (−3.0), Sr (−2.9), Ba (−2.9), Sc (−2.1), Y (−2.4), Al (−1.7). All these metals are examples of suitable metals with cations having a redox potential of the metal of at most −1 V.

Suitable examples of ammonium ions can be represented by the general formula $R^wR^xR^yR^zN^+$, wherein $R^w$, $R^x$, $R^y$, and $R^z$ each individually may represent hydrogen (H), or a $C_1$-$C_{20}$ alkyl, aryl, alkylaryl or arylalkyl group, that each optionally may contain one or more hetero-atoms (e.g. oxygen, phosphor, nitrogen or sulphur atoms) and/or substituents. The groups may be linear, or branched; they also may contain one or more unsaturations or substituents. Merely by way of example such ammonium ions might be, for instance, mono-, di-, tri-, or tetra-methylammonium; mono-, di-, tri-, or tetra-ethylammonium; mono-, di-, tri-, or tetrabutylammonium; trimethylbenzyl-ammonium; dimethylbenzylammonium; mono-, di-, tri-, or tetraoctylammonium; hydroxylammonium; hydrazonium; etc.

$R^w$ in the above formula $R^wR^xR^yR^zN^+$ can also be selected from the group of —$OR^x$ and —$NR^xR^y$ groups, $R^x$ and $R^y$ having the same meaning as described above for $R^wR^xR^yR^zN^+$.

Preferred bases that most suitably can be used in the resin compositions according to the invention will be described herein below in more detail. Of course, also mixtures of such bases may be applied according to the invention.

Preferably the resin composition according to the invention comprises a base of which the cation has a redox potential of the metal of at most −1.5 V. Suitable examples of such metal ion cations already have been shown above, together with their redox potential values of the metal.

It is particularly preferred that at least one of the bases present while the resin composition is being cured is based on an alkaline or earth alkaline metal, or is an ammonium salt. Most preferably at least one of the said bases is based on Li, Na or K. When the bases are used in an organic medium it is particularly preferred that at least one of the said bases is an organosoluble salt. Organic bases are by their nature organosoluble bases, and thus, according to another preferred embodiment of the invention the resin composition comprises a nitrogen-containing compound, and more particularly an amine as the base.

Suitable examples of nitrogen-containing compounds to be used as bases in the resin compositions according to the invention are ammonium oxides, hydroxides and alkoxides. Examples of the ammonium ions already have been listed above. Other suitable examples of nitrogen-containing compounds (in principle non-ionic, but possibly becoming positively charged in situ; the nitrogen compound then can be present in the form of a salt) can be represented by the general formula $R^wR^xR^yN$, wherein $R^w$, $R^x$, and $R^y$ each individually may have the meaning as described above. This general formula $R^wR^xR^yN$ also represents nitrogen compounds, wherein the nitrogen atom shown in the formula is part of a cyclic system formed by two of the groups $R^w$, $R^x$, and $R^y$, or is present in the form of an imine group or as a phosphazene (in which latter cases the general formula in fact can be represented as $R^wR^xN$). Of course, $R^w$, $R^x$, and $R^y$ themselves also individually may contain additional nitrogen atoms. Merely by way of example such nitrogen-containing compounds might be chosen, for instance, from 1,8-diazabicyclo-[5,4,0]-undec-7-ene (DBU); 1,4-diazabicyclo-[2,2,2]-octane (DABCO); 1,5-diazabicyclo-[4,3,0]-non-5-ene (DBN); morpholine; piperidine; dimethylaniline; N,N-di-isopropanol-toluidine (DiPT); hydroxylamine; alkylhydrazides; alkylhydrazines; imines (e.g. benzylidenephenylamine; N-[(E)-ethylidene]-2-methylpropanamine; 5-methyl-1-pyrroline; 2,4,4-trimethyl-2-oxazoline; 4-phenylimino-2-pentanone); phosphazenes (e.g. compounds known as $P_4$-t-Bu and $P_4$-t-Oct); guanidine; tetramethylguanidine (TMG); etc.

More preferably the nitrogen-containing organic compound is a tertiary amine.

Especially suitable organic aliphatic tertiary amines from the above mentioned list are: DABCO, DBU, DBN and the phosphazene bases.

Most preferably, in one preferred selection of bases, the nitrogen-containing organic compound is an aliphatic amine, preferably an aliphatic tertiary amine. In another preferred selection of bases, the nitrogen-containing organic compound is an amine having a $pK_a$ value of 11 or higher.

The skilled man can easily select such suitable aliphatic tertiary amines, respectively amines having a $pK_a$ value of 11 or higher.

For better understanding of the invention, and for proper assessment of the amounts of the base, respectively of the dioxo-component and/or other components of the unsaturated polyester resin or vinyl ester resin compositions according to the invention, the term "basic resin system" is introduced here. As used herein, the term "basic resin system" is understood to mean the total weight of the resin, but excluding compounds not being soluble therein, such as fillers as may be used when applying the resin system for its intended uses. The basic resin system therefore consists of the polymer containing reactive unsaturations, and any reactive diluent and any additives present therein (i.e. except for the peroxide component that is to be added shortly before the curing) for making it suitable for being cured, for instance all kinds of compounds soluble in the resin, such as initiators, accelerators, inhibitors, stabilizers, colorants (dyes), release agents etc., as well as styrene and/or other solvents as may usually be present therein. The amount of additives soluble in the resin usually may be as from 1 to 25 wt. % of the basic resin system; the amount of styrene and/or other solvent may be as large as, for instance, up to 75 wt. % of the basic resin system. The basic resin system, however, explicitly does not include compounds not being soluble therein, such as fillers (e.g. glass or carbon fibers), talc, clay, solid pigments, low-profile agents, thixotropic agents, flame retardants, e.g. aluminium oxide hydrates, etc.

Calculating the total weight of the basic resin system of a resin composition while excluding the weight of fillers, low-profile agents, thixotropic agents, enforcement materials, etc. which do not form part of the resin composition (i.e. in the present case the polymer containing reactive unsaturations, the optionally present reactive diluent and the 1,3-dioxo-component(s)) is standard practice in the field of unsaturated polyester and vinyl ester resins. Instead of expressing the amounts of specific components in as a weight percentage (wt. %) of the basic resin system, these amounts also can be expressed as molar amounts, preferably in mmol/kg of basic resin system.

The amount of base that may be used in the resin compositions according to the invention, can vary between wide ranges and the man skilled in the art can easily assess, for instance via simple gel time measurements, how much base is required.

Preferably, the base is present in an amount of from 0.001 to 2,000 mmol/kg of basic resin system. More preferably, the base is present in an amount of from 0.01 to 200 mmol/kg of basic resin system. Most preferably, the base is present in an amount of from 0.1 to 100 mmol/kg of basic resin system.

The 1,3-dioxo-compound that is used in the resin compositions according to the invention is, as mentioned above, preferably either
(i) a 1,3 dioxo-compound according to formula 1

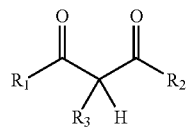

in which, independently from each other,
R1 and R2 represent hydrogen, or a $C_1$-$C_{20}$ alkyl or aryl or alkylaryl group, that optionally may contain heteroatoms and/or one or more ethylenic unsaturations at positions other than α to the oxo group, or represent a group $OR_4$ or $NR_4R_5$, with $R_4$ and $R_5$ representing hydrogen, or a $C_1$-$C_{20}$ alkyl or aryl or alkylaryl group, that optionally may contain heteroatoms and/or one or more ethylenic unsaturations, with $R_4$ and $R_5$ together with N forming a cyclic structure and
$R_3$ represents hydrogen, or a $C_1$-$C_{20}$ alkyl or aryl or alkylaryl group, that optionally may contain heteroatoms and/or one or more ethylenic unsaturations at positions other than α to the oxo groups, and wherein
any of the groups $R_1$ to $R_3$ can be cyclic, or the groups $R_1$ and $R_2$, or $R_1$ and $R_3$, or $R_2$ and $R_3$, or $R_1$ and $R_2$ and $R_3$ together form a cyclic structure,
or the 1,3-dioxo-component is
(ii) an oligomer or polymer of the compound of formula 1, which oligomer or polymer contains at least one 1,3-dioxo group.

Preferably, in the 1,3-dioxo-compound according to formula 1, $R_1$ of the 1,3-dioxo-component is a $C_1$-$C_5$ group or is an $OR_4$ group in which $R_4$ is selected from the group of $C_1$-$C_{20}$ alkyl, aryl, and alkylaryl groups.

It is further particularly preferred, that $R_2$ of the 1,3-dioxo-component is selected from the group of $C_1$-$C_5$ alkyl groups, and that $R_3$ of the 1,3-dioxo-component is hydrogen.

It is, moreover, more particularly preferred, that $R_1$ of the 1,3-dioxo-component is an $OR_4$ group in which the group $R_4$ contains a polymerizable group.

Suitable polymerizable groups are, for instance, but without being limited (meth)acrylates, fumarates maleates, itaconates, allylethers, allyl esters, vinyl ethers, vinyl esters, vinyl amides. Preferably, the polymerizable group is a (meth)acrylate.

The oligomers or polymers of the compound of formula 1, as also suitably can be used as 1,3-dioxo-components in the resin compositions according to the invention, can suitably be obtained by oligomerization or polymerization of such polymerizable groups.

In a very preferred embodiment of the 1,3-dioxo-component according to formula 1, $R_1$ is an $OR_4$ group, and the polymerizable group in $R_4$ is a (meth)acrylate.

Accordingly, very preferred 1,3-dioxo-compounds to be used in the present invention are, for instance, dialkylmalonates (e.g. dimethyl-, diethyl-, dipropyl- and didodecylmalonates); alkylacetoacetates (such as methyl-, ethyl-, propyl and dodecyl acetoacetates); acetoxy acetyl ethyl acrylate (AAEA), acetoxy acetyl ethyl methacrylate (AAEMA); acetoxy acetyl propyl acrylate (AAPA), acetoxy acetyl propyl methacrylate (MPMA); acetylacetone. Very suitable oligomers or polymers are derived from, e.g. dialkylmalonates, AAEA and MEMA.

The amount of the 1,3-dioxo-component in the resin compositions according to the invention can vary between wide ranges. Of course, instead of one 1,3-dioxo-component also a mixture of some 1,3-dioxo-components may be used. Preferably, the amount of the one or more 1,3-dioxo-components is between 0.001 and 25% by weight, calculated on the total weight of the basic resin system of the resin composition, which total weight is determined excluding fillers and the like. More preferably, said amount is between 0.01 and 10% by weight, and most preferably it is between 0.1 and 5% by weight.

The polymer containing reactive unsaturations as is comprised in the unsaturated polyester resin or vinyl ester resin compositions according to the present invention, may suitably be selected from the unsaturated polyester resins or vinyl ester resins as are known to the skilled man. Examples of suitable unsaturated polyester or vinyl ester resins to be used as basic resin systems in the resins of the present invention are, subdivided in the categories as classified by Malik et al., M.S.—Rev. Macromol. Chem. Phys., C40(2&3), p. 139-165 (2000).

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.
(2) Iso-resins: these are prepared from isophthalic acid, maleic anhydride or fumaric acid, and glycols. These resins may contain higher proportions of reactive diluent than the ortho resins.
(3) Bisphenol-A-fumarates: these are based on ethoxylated bisphenol-A and fumaric acid.
(4) Chlorendics: are resins prepared from chlorine/bromine containing anhydrides or phenols in the preparation of the UP resins.

(5) Vinyl ester resins: these are resins, which are mostly used because of their because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished.

All of these resins, as can suitably be used in the context of the present invention, may be modified according to methods known to the skilled man, e.g. hydroxyl number or anhydride number, or for becoming more flexible due to insertion of flexible units in the backbone, etc. Modifications, which result in lower acid values are especially suited in the context of the present invention. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the—basic—unsaturated polyester resins used in the present invention may contain solvents. The solvents may be inert to the—basic—resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam. Preferably the—basic—unsaturated polyester resins contain at least 5 wt. % of a reactive solvent.

The unsaturated polyester resins and vinyl ester resins as are being used in the context of the present invention may be any type of such resins, but preferably are chosen from the group of DCPD-resins, iso-phthalic resins, ortho-phthalic resins and vinyl ester resins. More detailed examples of resins belonging to such groups of resins have been shown in the foregoing part of the specification.

It is preferred that the molecular weight of the polymer containing reactive unsaturations is in the range of from 500 to 200,000 g/mol, and more preferably the molecular weight of the polymer containing reactive unsaturations is in the range of from 750 to 75,000 g/mol. For viscosity reasons it is even more preferred to employ resins in which the molecular weight of the polymer containing reactive unsaturations is in the range of from 1,000 to 10,000 g/mol.

For reducing the viscosity further it can be useful to employ diluents. In such case most preferably reactive diluents are used. In such preferred embodiment of the invention the resin composition also contains one or more reactive diluents. A list of possible reactive diluents is shown above. Preferably the reactive diluent is a (meth)acrylate and/or styrene.

As mentioned above inhibitors and/or stabilizers can be applied to control the gel time and/or the storage stability of the resin compositions according to the invention. Therefore, in another embodiment of the invention the resin composition also contains one or more inhibitors and/or stabilizers.

Preferably the inhibitors and/or stabilizers are selected from the groups of: (i) phenolic compounds; (ii) N-oxyl based compounds; (iii) phenothiazine based compounds; or (iv) any combination of phenolic and/or -oxyl based and/or phenothiazine based compounds. More preferably the one or more inhibitors and/or stabilizers are selected from the groups of phenolic and/or N-oxyl based compounds.

The amount of inhibitor and/or stabilizer, preferably selected from the groups of phenolic and/or N-oxyl based inhibitors and/or stabilizers, as used in the context of the present invention, may, however, vary within rather wide ranges, and may be chosen as a first indication of the gel time and/or storage stability as is desired to be achieved. Preferably the inhibitor and/or stabilizer is used in an amount of from about 0.001 to 35 mmol per kg of basic resin system, more preferably in an amount of more than 0.01, and most preferably in an amount of more than 0.1 mmol per kg of basic resin system.

The skilled man quite easily can assess, in dependence of the type of inhibitor selected, which amount thereof leads to good results according to the invention.

Suitable examples of inhibitors and/or stabilizers that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Most surprisingly, in the context of the present invention, phenolics tend to be excellent stabilizers (that is to say, they give improved storage stability at room temperature, without significantly affecting the gel time), whereas the N-oxyl compounds particularly improve the gel time and, moreover, improve the storage stability.

The resins as are being used in the resin compositions according to the invention all can be cured by means of peroxide curing. According to the present invention, in addition to the peroxide specific 1,3-dioxo-components and bases are applied as accelerator, but also other (co-)accelerators can be applied. The peroxides used for the initiation can be any peroxide known to the skilled man for being used in curing of unsaturated polyester resins and vinyl ester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. They can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), and other hydroperoxides (such as, for instance, cumene hydroperoxide), the special class of hydroperoxides formed by the group of ketone peroxides (such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), perethers (such as, for instance, peroxy diethyl ether). Often the organic peroxides used as curing agent are tertiary peresters or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Preferably, the resin compositions according to the invention are curable with a liquid or dissolved peroxide component. Most preferably the peroxide is a liquid or dissolved hydroperoxide component.

The liquid or dissolved hydroperoxide component, of course, also may be a mixture of hydroperoxides. When curing the resins for their final use, it is generally easier that they are cured with liquid hydroperoxides: these have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

The present inventors have observed, that the curing of the resin compositions according to the invention with a peroxide component can be co-accelerated by means of the presence—while curing—of a transition metal. Thus, the resin compositions according to the invention advantageously contain—when being cured—a transition metal salt or complex.

Preferably these transition metals are selected from the group of transition metals in which the transition metal salt or complex possesses a redox potential of the metal between −1 and +2 V. In an earlier part of this application a more detailed discussion of redox potentials is presented. More preferably, the transition metal is a metal having an atomic number in the range of 21-30 or 3948. The transition metals with the atomic number in the range of 21-30 are especially preferred. Most preferably the transition metal is selected from the group of V, Mn and Fe.

The amount of transition metal to be present in the resin composition during the curing can vary widely and depends, for instance, on the activity and on the color of the transition metal salts or complexes. A man skilled in the art can easily assess the most suitable amounts and types of transition metal or complex thereof. It is preferred, however, that the amount of transition metal or complex is between 0.0001 and 10% by weight relative to the amount of resin.

The invention also relates to cured objects obtained from a resin composition according to the invention, by curing with a peroxide component. Furthermore the invention also relates to a method for curing of an unsaturated polyester resin or vinyl ester resin composition comprising (i) a polymer containing reactive unsaturations as a resin, and (ii) a dioxo-component, and (iii) optionally a reactive diluent and/or an inhibitor and/or a stabilizer;

wherein a. a resin composition according to the main claim of this application is prepared, and in that b. said resin composition is cured with a peroxide component, optionally being co-accelerated by means of a transition metal compound, and in that c. said resin composition contains—while being cured—a base, which is either (i) selected from the group of organic or inorganic oxides, hydroxides, alkoxides or carboxylates for each of which the cation has a redox potential of the metal of at most −1 V, or of ammonium ions; or is (ii) selected from the group of nitrogen-containing organic compounds; and d. a 1,3-dioxo-component.

Preferably, in this method of curing, the 1,3-dioxo-component is a compound according to formula 1, or an oligomer or polymer of a compound of formula 1, which oligomer or polymer contains at least one 1,3-dioxo group.

The 1,3-dioxo-components according to formula 1 are described in detail in the foregoing parts of the specification, which description does not need to be repeated here.

In a preferred embodiment of this method for curing the 1,3-dioxo-component is present in the resin composition before the peroxide component is added for curing.

Finally the invention relates to the use of a resin composition according to the invention or obtained with the process according to the invention in any one of the areas of chemical anchoring, construction, roofing, flooring, windmill blades, containers, tanks, pipes, automotive parts or boats.

The invention is now further illustrated in the following experimental part by means of the examples and comparative experiments without being restricted to the specific examples shown.

EXPERIMENTAL PART

Monitoring of Curing

In most of the Examples and Comparative Examples presented hereinafter it is mentioned, that curing was monitored by means of standard gel time equipment. This is intended to mean that both the gel time ($T_{gel}$ or $T_{->35°\ C.}$) and peak time ($T_{peak}$ or $T_{->peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

Synthesis of Resin A

A reaction vessel was charged with 1000 g Palatal 6, a resin commercially available from DSM Composite Resins, Schaffhausen. The styrene was distilled of under reduced pressure. 65 g Benzylalcohol was added and the temperature was raised slowly to 205° C. At this temperature water was distilled off and the reaction mixture was kept at this temperature till the acid value was below 5. The mixture was cooled to 100° C. and 350 g styrene was added. After stirring for an additional 30 min a homogenous resin with an acid value of 3 was obtained.

Examples 1.1-1.3 and Comparative Examples A-D 100 g of resin A was mixed with various amounts of acetylaceto ethyl methacrylate (AAEMA), lithium neodecanoate in white spirits (2% Li metal) and cured with 1% Butanox M50 which was monitored with the geltime equipment. The results are shown in table 1.

For comparison, experiments A and B were performed, respectively without AAEMA and without Li, and experiments C and D were performed with an untreated Palatal 6 resin, having an acid value of 33, as is commercially available from DSM Composite Resins, Schaffhausen, Switzerland.

TABLE 1

| Example/<br>Comp.<br>Example | AAEMA<br>(g) | Base (g) | $T_{gel}$<br>(minutes) | $T_{peak}$<br>(minutes) | Peak temp<br>(° C.) |
|---|---|---|---|---|---|
| Resin A | | Li | | | |
| 1.1 | 1 | 2.5 | 5.5 | 14.9 | 153 |
| 1.2 | 5 | 0.5 | 77.6 | 90.6 | 36 |
| 1.3 | 5 | 2.5 | 6.1 | 14.4 | 159 |
| Comp. A | 0 | 2.5 | >1,200 | nd | nd |
| Comp. B | 5 | 0 | >1,200 | nd | nd |
| Palatal 6 | | Li | | | |
| Comp. C | 1 | 2.5 | >1,200 | nd | nd |
| Comp. D | 5 | 2.5 | >1,200 | nd | nd |

These experiments clearly demonstrate that for efficient curing a resin with an acid value <10 mmol/kg, an 1,3-dioxo-component and a base are required. Furthermore these experiment demonstrate that the gel time can be tuned by varying the amounts of base and/or 1,3-dioxo-component.

Examples 2.1-2.5 and Comparative Examples E and F

To various amounts of Daron XP41-A-2 (a resin commercially available from DSM Composite Resins, Schaffhausen, Switzerland; having an acid value of 0.9) as indicated in table 2, there were added various amounts of AAEMA, respectively various amounts of specified metal salts. After stirring for 5 min Butanox M50 was added. The results are shown in table 2

TABLE 2

| Example/<br>Comp.<br>Example | Daron<br>XP-41-A-<br>2 (g) | AAEMA<br>(g) | Base<br>and<br>metal<br>type (g) | M50<br>(g) | $T_{gel}$<br>(min.) | $T_{peak}$<br>(min.) | Peak<br>Temp<br>(° C.) |
|---|---|---|---|---|---|---|---|
| 2.1 | 95.72 | 4.28 | 1.01 Li | 1 | 4.8 | 8.5 | 145 |
| 2.2 | 95.72 | 4.28 | 2.00 Li | 2 | 1.8 | 4.5 | 149 |
| 2.3 | 98.00 | 2.00 | 1.00 Li | 1 | 4.7 | 8.8 | 144 |
| 2.4 | 98.00 | 2.00 | 1.00 K | 1 | 22.2 | 31.9 | 130 |
| 2.5 | 98.00 | 2.00 | 0.87 Ca | 1 | 18.0 | 29.7 | 105 |
| Comp. E | 95.72 | 4.28 | 0 | 2 | >1,200 | nd | nd |
| Comp. F | 100.00 | | 0.1 Co | 1 | >1,200 | nd | nd |

Li = Li ethylhexanoate in white spirits (2% Li metal)
K = 15% K ethylhexanoate in PEG
Ca = naphtenate in spirits (5% Ca metal)
Co = Durham Cobalt 10F (10% Co metal)

These examples and comparative examples show that various metal bases can suitably be used. It is, moreover, to be noted that, as for instance can be seen from Comp. F, cobalt curing according to the state of art is not effective for resins having a low acid value.

Examples 3.1-3.8

To 40 g of Daron XP-45 (a vinyl ester resin, acid value 5; commercially available from DSM Composite Resins, Schaffhausen, Switzerland) was added 2.5 g of 1,3-dioxo-component and 1.2 g of various metal salts, as indicated in table 3. After stirring for 5 min 3% Butanox M50 was added. The results are shown in table 3:

TABLE 3

| Example | 1,3-dioxo<br>component<br>(g) | Base and<br>metal<br>type (g) | $T_{gel}$<br>(min.) | $T_{peak}$<br>(min.) | Temp<br>(° C.) |
|---|---|---|---|---|---|
| 3.1 | AAEMA | Li | 1.6 | 3.2 | 182 |
| 3.2 | AAEMA | K | 1.3 | 3.2 | 182 |
| 3.3 | EAA | Li | 2 | 4.4 | 168 |
| 3.4 | EAA | K | 2 | 4.4 | 175 |
| 3.5 | AA | Li | 8.2 | 24.3 | 48 |
| 3.6 | AA | K | 8.6 | 21.5 | 115 |
| 3.7 | DMM | Li | 219 | 253 | 39 |
| 3.8 | DMM | K | 15.6 | 27.2 | 150 |

AAEMA = acetylaceto ethyl methacrylate
EAA = ethylacetoacetate
AA = acetylacetone
DMM = dimethylmalonate These experiments demonstrate that various 1,3-dioxo-components can be used. Moreover they demonstrate that the best results are obtained with mixed 1,3-dioxo functionalities.

Examples 4.1-4.11

To 40 g of resins as indicated in table 4 (all resins obtainable from Cray Valley, France; and all having an acid value of less than 1) was added x g MEMA and y g of various metal salts, as indicated in the table. After stirring for 5 min 3% Butanox M50 was added. The results are shown in table 4:

TABLE 4

| Example | Resin<br>type | AAEMA<br>(g) | Base and<br>metal (g) | $T_{gel}$<br>(min.) | $T_{peak}$<br>(min.) | Temp<br>(° C.) |
|---|---|---|---|---|---|---|
| 4.1 | CD 540 | 1.0 | 1.2 Li | 2 | 4.4 | 123 |
| 4.2 | CD 540 | 1.0 | 1.2 K | <0.4 | | |
| 4.3 | CD 540 | 0.5 | 1.2 K | <0.4 | | |
| 4.4 | CD 540 | 1.0 | 0.6 K | 0.8 | 2.5 | 131 |
| 4.5 | CD 540 | 0.5 | 0.6 K | 1.1 | 3.1 | 119 |
| 4.6 | SR 231 | 1.0 | 1.2 Li | 2.4 | 4.6 | 220 |
| 4.7 | SR 231 | 1.0 | 1.2 K | <0.4 | | |

TABLE 4-continued

| Example | Resin type | AAEMA (g) | Base and metal (g) | $T_{gel}$ (min.) | $T_{peak}$ (min.) | Temp (° C.) |
|---|---|---|---|---|---|---|
| 4.8 | SR 231 | 0.5 | 0.6 K | 1.2 | 2.8 | 205 |
| 4.9 | SR 350 | 1.0 | 1.2 Li | 2.6 | 5.6 | 163 |
| 4.10 | SR 350 | 1.0 | 1.2 K | <0.4 | | |
| 4.11 | SR 350 | 0.5 | 0.6 K | 1.2 | 2.9 | 180 |

Li = Li ethylhexanoate in white spirits (2% Li metal)
K = 15% K ethylhexanoate in PEG Examples 5.1-5.8

A mixture of 980 g Daron XP-45 and 20 g AAEMA was divided in 40 g portions. To each portion was added a base, as indicated in table 5, and after 5 min stirring the resin was cured with 3% Butanox M50. The results are shown in table 5:

TABLE 5

| Example | Base | g of base | $T_{gel}$ (min.) | $T_{peak}$ (min.) | Temp (° C.) |
|---|---|---|---|---|---|
| 5.1 | K | 0.8 | 2.3 | 4.9 | 184 |
| 5.2 | Li | 0.22 | 2.5 | 4.7 | 187 |
| 5.3 | KOH (50% in H$_2$O) | 0.07 | 6.5 | 23.8 | 144 |
| 5.4 | LiOH (10% in H$_2$O) | 0.15 | 6 | 11.5 | 175 |
| 5.5 | (Bu)$_4$NOH (40% in H$_2$O) | 0.42 | 1.3 | 7.3 | 171 |
| 5.6 | N-methyl ethanol amine | 0.5 | 457 | 480 | 55 |
| 5.7 | DBU | 0.11 | <0.4 | | |
| 5.8 | DBU | 0.05 | 1.4 | 9.8 | 167 |

Li = Li ethylhexanoate in white spirits (2% Li metal)
K = 15% K ethylhexanoate in PEG
DBU = 1,8-diazabicyclo-[5,4,0]-undec-7-ene These results demonstrate that both organic as inorganic bases can be used. They illustrate that both weak as well as strong bases can be applied.

Examples 6.1 and 6.2

A mixture of 490 g Uralac ZW5198 (a resin commercially available from DSM Coating Resins, Zwolle, the Netherlands; acid value 2.4), 10 g MEMA and 0.08 g t-butyl catechol was divided in 100 g portions. To each portion was added a base and after 5 min stirring the resin was cured with 3% Butanox M50. The results are shown in table 6:

TABLE 6

| Example | Base | g of base | $T_{gel}$ (min.) | $T_{peak}$ (min.) | Temp (° C.) |
|---|---|---|---|---|---|
| 6.1 | KOH (50% in H$_2$O) | 1.8 | 1.3 | 17.3 | 132 |
| 6.2 | K | 1.9 | 8.5 | 12.7 | 181 |

Examples 7.1-7.4

To 47.86 g Atlac 430 (a resin commercially available from DSM Composite Resins, Schaffhausen, Switzerland; acid value 7) and 2.14 g of MEMA was added a base, as indicated, and after 5 min stirring the resin was cured with % Butanox M50. The results are shown in table 7:

TABLE 7

| Example | Base | g of base | M50 (g) | $T_{gel}$ (min.) | $T_{peak}$ (min.) | Temp (° C.) |
|---|---|---|---|---|---|---|
| 7.1 | LiOH (10% in H$_2$O) | 0.5 | 1 | 29.8 | 46.1 | 117 |
| 7.2 | LiOH (10% in H$_2$O) | 0.12 | 1 | 88 | 118.7 | 51 |
| 7.3 | Li | 2 | 1 | 3.6 | 8.3 | 163 |
| 7.4 | Li | 1 | 0.5 | 7.9 | 13.7 | 158 |

Examples 8.1-8.8

A mixture of 925 g Daron XP45, 50 g AAEMA and 25 g K octanoate (15% in PEG) was divided in 10 g portions. These portions were cured with 3% of various peroxides. The results are shown in table 8:

TABLE 8

| Example | Type of peroxide | $T_{gel}$ (min.) | $T_{peak}$ (min.) | Temp (° C.) |
|---|---|---|---|---|
| 8.1 | Butanox M50 | 3.4 | 6 | 185 |
| 8.2 | Trigonox 44B | 3.4 | 5.8 | 164 |
| 8.3 | Trigonox AW70 | 315 | 334 | 36 |
| 8.4 | Trigonox C | 751 | 768 | 41 |
| 8.5 | Cyclonox LE50 | 3.4 | 5.7 | 174 |
| 8.6 | Perkadox CH 50L | 11.2 | 18.4 | 158 |
| 8.7 | Perkadox 20S | 14.2 | 23.2 | 143 |
| 8.8 | H$_2$O$_2$ (30% in H$_2$O) | 2.5 | 4.4 | 166 |

These experiments clearly demonstrate that various peroxides can be used according to the invention Examples 9.1-9.4

A mixture of 970 g Daron XP-45, 20 g AAEMA and 10 g K octanoate (15% in PEG) was divided in 100 g portions. These portions were cured with various amounts of Butanox M50. The results are shown in table 9:

TABLE 9

| Example | Wt. % M50 | $T_{gel}$ (min.) | $T_{peak}$ (min.) | Temp (° C.) |
|---|---|---|---|---|
| 9.1 | 0.5 | 52.8 | 59.5 | 160 |
| 9.2 | 1 | 36 | 43 | 166 |
| 9.3 | 2 | 28.9 | 42 | 158 |
| 9.4 | 3 | 22.7 | 36.8 | 161 |

These experiments demonstrate that the gel time can be tuned with the amount of peroxide Examples 10.1-10.4

A mixture was prepared of 490 g of Cray Valley resin SR 231 (having an acid value of 0.4) with 10 g AAEMA, 0.52 g DBU (1,8-diazabicyclo-[5,4,0]-undec-7-ene) and separated into 100 g portions. The mixtures were cured at various temperatures using 3% Butanox M50. The results are shown in table 10:

TABLE 10

| Example | Curing temp (° C.) | $T_{\to 35° C.}$ (min.) | $T_{peak}$ (min.) | Peak temp (° C.) |
|---|---|---|---|---|
| 10.1 | 25 | 1.5 | 3.1 | 211 |
| 10.2 | 15 | 3.9 | 5.2 | 208 |
| 10.3 | 5 | 6.2 | 7.5 | 204 |
| 10.4 | −10 | 22.8 | 24.5 | 179 |

These examples demonstrate that resin systems according to the invention are very suitable for low temperature curing.

Example 11.1-11.3

A mixture of 98 g resin and, 2 g MEMA was prepared. 16 mmol/kg resin of base was added followed by stirring for 5 minutes after which the mixture was cooled to 0° C. 3 g Butanox M50 was added at 0° C. and the cure was monitored with the gel time equipment. The results are shown in table 11.

TABLE 11

| Ex. | Resin | base | $T_{->35°C.}$ (min.) | $T_{peak}$ (min.) | Peak temp (° C.) |
|---|---|---|---|---|---|
| 11.1 | Daron XP45 | K | 83 | 91 | 174 |
| 11.2 | Cray Valley SR350 | DBU | 4 | 7 | 102 |
| 11.3 | Cray Valley SR351 | DBU | 24 | 25 | 268 |

These experiments further illustrate that the formulations according to the invention are very suited for low temperature curing.

Example 12.1-12.7

A mixture of 940 g Daron XP45, 40 g MEMA and 20 g K octanoate (15% in PEG) was divided in 100 g portions. To these portions various amounts of Tempol was added. After stirring for 5 min 3 g Butanox M50 was added and the cure was monitored with the gel time equipment. The results are shown in table 12:

TABLE 12

| Example | Tempol (mmol/kg) | $T_{gel}$ (min.) | $T_{peak}$ (min.) | Peak temp (° C.) |
|---|---|---|---|---|
| 12.1 | 0 | 5 | 9 | 184 |
| 12.2 | 0.1 | 5 | 9 | 184 |
| 12.3 | 0.2 | 5 | 9 | 183 |
| 12.4 | 0.5 | 7 | 11 | 181 |
| 12.5 | 1 | 10 | 15 | 182 |
| 12.6 | 2 | 12 | 17 | 179 |
| 12.7 | 5 | 43 | 52 | 162 |

These examples clearly demonstrate that the gel time can be adjusted with inhibitors and/or stabilizers.

Example 13.1-13

A mixture of 940 g Daron XP-45, 40 g AAEMA and 20 g K octanoate (15% in PEG) was divided in 100 g portions. To these portions various amounts of t-butyl catechol was added. After stirring for 5 min 3 g Butanox M50 was added and the cure was monitored with the gel time equipment. The results are shown in table 13:

TABLE 13

| Example | t-butyl-catechol (mmol/kg) | $T_{gel}$ (min.) | $T_{peak}$ (min.) | Peak temp (° C.) |
|---|---|---|---|---|
| 13.1 | 0 | 5.3 | 8.9 | 184 |
| 13.2 | 0.1 | 5.3 | 8.8 | 184 |
| 13.3 | 0.2 | 4.7 | 8.0 | 184 |
| 13.4 | 0.5 | 4.4 | 7.7 | 186 |
| 13.5 | 1 | 4.3 | 7.5 | 183 |
| 13.6 | 2 | 3.9 | 7.3 | 188 |

TABLE 13-continued

| Example | t-butyl-catechol (mmol/kg) | $T_{gel}$ (min.) | $T_{peak}$ (min.) | Peak temp (° C.) |
|---|---|---|---|---|
| 13.7 | 5 | 4.2 | 7.6 | 184 |
| 13.8 | 10 | 4.4 | 8.1 | 177 |

These examples demonstrate that a phenolic compound like t-butyl catechol functions as a stabilizer without dramatically affecting the gel time.

The invention claimed is:
1. A cured unsaturated polyester resin or vinyl ester resin composition comprising:
   (i) a polymer containing reactive unsaturations as a resin, and
   (ii) between 0.001 and 25% by weight of a 1,3-dioxo-component, and
   (iii) optionally a reactive diluent, an inhibitor, a stabilizer or combinations thereof; wherein
   (a) the resin composition is cured with a peroxide component;
   (b) the resin in the resin composition has an acid value≤10; and
   (c) the resin composition contains a base which is either
   (i) selected from the group consisting of organic or inorganic oxides, hydroxides, alkoxides and carboxylates for each of which the cation has a redox potential of a metal of at most −1.5 V and the metal is an alkaline or earth alkaline metal, or of ammonium ions; or is
   (ii) selected from the group consisting of aliphatic amines, wherein the base is present in an amount of from 0.001 to 2,000 mmol/kg of basic resin system, and wherein the 1,3-dioxo-component is either
   (1) a 1,3 dioxo-compound according to formula 1

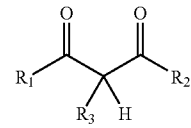

in which, independently from each other,
R₁ and R₂ represent hydrogen, or a $C_1$-$C_{20}$ alkyl or aryl or alkylaryl group, that optionally contain heteroatoms, one or more ethylenic unsaturations at positions other than an α position thereof to the oxo group or a combination thereof, or represent a group $OR_4$ or $NR_4R_5$, with $R_4$ and $R_5$ representing hydrogen, $C_1$-$C_{20}$ alkyl group, an aryl group or an alkylaryl group, that optionally contains heteroatoms, one or more ethylenic unsaturations or combinations thereof, with $R_4$ and $R_5$ together with N forming a cyclic structure, and $R_3$ represents hydrogen, a $C_1$-$C_{20}$ alkyl, an aryl group or an alkylaryl group, that optionally contains heteroatoms, one or more ethylenic unsaturations at positions other than an α position thereof to the oxo groups, or combinations thereof, and wherein any of the groups $R_1$ to $R_3$ can be cyclic, or the groups $R_1$ and $R_2$, or $R_1$ and $R_3$, or $R_2$ and $R_3$, or $R_1$ and $R_2$ and $R_3$ together form a cyclic structure, or
(2) an oligomer or polymer of the compound of formula 1, wherein the oligomer or polymer contains at least one 1,3-dioxo group.
2. The resin composition according to claim 1, wherein the resin in the resin composition has an acid value<5.

3. The resin composition according to claim 2, wherein the resin in the resin composition has an acid value<3.

4. The resin composition according to claim 3, wherein the resin in the resin composition has an acid value<1.

5. The resin composition according to claim 1, wherein at least one of the metal bases is based on Li, Na or K.

6. The resin composition according to claim 1, wherein at least one of the bases is an organosoluble salt.

7. The resin composition according to claim 1, wherein the aliphatic amine base is a tertiary aliphatic amine.

8. The resin composition according to claim 1, wherein the aliphatic amine base is an aliphatic amine with a pKa value of 11 or higher.

9. The resin composition according to claim 1, wherein the base is present in an amount of from 0.01 to 200 mmol/kg of basic resin system.

10. The resin composition according to claim 9, wherein the base is present in an amount of from 0.1 to 100 mmol/kg of basic resin system.

11. The resin composition according to claim 1, wherein $R_1$ of the 1,3-dioxo-component is a $C_1$-$C_5$ alkyl group or is an $OR_4$ group in which $R_4$ is selected from the group of $C_1$-$C_{20}$ alkyl, aryl, and alkylaryl groups.

12. The resin composition according to claim 1, wherein $R_2$ of the 1,3-dioxo-component is selected from the group of $C_1$-$C_5$ alkyl groups.

13. The resin composition according to claim 1, wherein $R_3$ of the 1,3-dioxo-component is hydrogen.

14. The resin composition according to claim 1, wherein $R_1$ of the 1,3-dioxo-component is an $OR_4$ group in which the group $R_4$ contains a polymerizable group.

15. The resin composition according to claim 14, wherein $R_1$ is an $OR_4$ group, wherein the polymerizable group is a (meth)acrylate.

16. The resin composition according to claim 1, wherein the amount of the 1,3-dioxo-component is between 0.01 and 10% by weight.

17. The resin composition according to claim 16, wherein the amount of the 1,3-dioxo-components is amount between 0.1 and 5% by weight.

18. The resin composition according to claim 1, wherein the molecular weight of the polymer containing reactive unsaturations is in the range of from 500 to 200,000 g/mol.

19. The resin composition according to claim 18, wherein the molecular weight of the polymer containing reactive unsaturations is in the range of from 750 to 75,000 g/mol.

20. The resin composition according to claim 19, wherein the molecular weight of the polymer containing reactive unsaturations is in the range of from 1,000 to 10,000 g/mol.

21. The resin composition according to claim 1, wherein the resin composition also contains one or more reactive diluents.

22. The resin composition according to claim 21, wherein the reactive diluent is a (meth)acrylate, and/or styrene or a combination thereof.

23. The resin composition according to claim 1, wherein the resin composition also contains one or more inhibitors, stabilizers or a combination thereof.

24. The resin composition according to claim 23, wherein the resin composition contains one or more inhibitors selected from phenolic inhibitors, stabilizers selected from the groups of phenolic, N-oxyl based inhibitors, stabilizers, and combinations thereof.

25. The resin composition according to claim 23, wherein the inhibitor, stabilizer or combination thereof is present used in an amount of from about 0.001 to 35 mmol per kg of basic resin system.

26. The resin composition according to claim 1, wherein the resin composition is cured with a liquid or dissolved peroxide component.

27. The resin composition according to claim 26, wherein the peroxide component is a liquid or dissolved hydroperoxide component.

28. Cured objects comprising the cured resin composition according to claim 1.

29. A product comprising the cured resin composition according to claim 1, wherein the product is selected from the group consisting of chemical anchors, construction products, roofing products, flooring, windmill blades, containers, tanks, pipes, automotive parts and boats.

30. The resin composition according to claim 1, wherein the aliphatic amine base is an aliphatic tertiary amine.

31. The resin composition according to claim 23, wherein the inhibitor, stabilizer, or combination thereof is present used in an amount of more than 0.01 mmol per kg of basic resin system.

32. The resin composition according to claim 23, wherein the inhibitor, stabilizer or combination thereof is present used in an amount of more than 0.1 mmol per kg of basic resin system.

* * * * *